US011029832B1

(12) United States Patent
Griffith et al.

(10) Patent No.: US 11,029,832 B1
(45) Date of Patent: Jun. 8, 2021

(54) DYNAMIC LINEAR CONTROL INTERFACE FOR SPATIAL-TEMPORAL COORDINATE TRACKING

(71) Applicant: Gametime, San Francisco, CA (US)

(72) Inventors: Bradley Griffith, San Francisco, CA (US); Ben Kim, Los Altos, CA (US); Pete DeiTos, San Francisco, CA (US); Matthew Lew, San Francisco, CA (US); Taylor Perkins, San Jose, CA (US); Jairo Avalos, San Francisco, CA (US); Mike Silvis, San Francisco, CA (US)

(73) Assignee: Gametime, San Francisco, CA (US)

( * ) Notice: Subject to any disclaimer, the term of this patent is extended or adjusted under 35 U.S.C. 154(b) by 493 days.

(21) Appl. No.: 15/612,802

(22) Filed: Jun. 2, 2017

Related U.S. Application Data

(60) Provisional application No. 62/344,916, filed on Jun. 2, 2016.

(51) Int. Cl.
| | | |
|---|---|---|
| *G06F 3/0484* | (2013.01) | |
| *G06F 3/0482* | (2013.01) | |
| *G06Q 50/00* | (2012.01) | |
| *G06Q 10/02* | (2012.01) | |

(52) U.S. Cl.
CPC ........ *G06F 3/04847* (2013.01); *G06F 3/0482* (2013.01); *G06Q 10/02* (2013.01); *G06Q 50/01* (2013.01)

(58) Field of Classification Search
CPC ......... G06Q 10/109; G06Q 10/02–025; G06Q 30/0641–0643; G06Q 30/08; G06Q 50/01; G06Q 30/06–08; G06F 3/048; G06N 5/048
See application file for complete search history.

(56) References Cited

U.S. PATENT DOCUMENTS

| | | | |
|---|---|---|---|
| 2007/0143345 A1* | 6/2007 | Jones | G06F 16/288 |
| 2012/0128239 A1* | 5/2012 | Goswami | G06Q 30/0243 |
| | | | 382/162 |
| 2013/0124356 A1* | 5/2013 | Bhogal | G06Q 30/08 |
| | | | 705/26.3 |
| 2014/0279131 A1* | 9/2014 | Sullivan | G06Q 30/0601 |
| | | | 705/26.1 |
| 2014/0282205 A1* | 9/2014 | Teplitsky | G06F 3/0483 |
| | | | 715/776 |
| 2015/0242916 A1* | 8/2015 | Godsey | G06Q 30/0613 |
| | | | 705/5 |
| 2016/0148123 A1* | 5/2016 | Paleja | G06Q 10/02 |
| | | | 705/5 |
| 2016/0155181 A1* | 6/2016 | Romaya | G06Q 30/0282 |
| | | | 705/26.63 |
| 2016/0189166 A1* | 6/2016 | Bryant | G06Q 30/018 |
| | | | 705/317 |

OTHER PUBLICATIONS

CalgaryHeralddotcom. "Atom App Helps Skip Theatre Lines Ups." YouTube, YouTube, Mar. 10, 2016, www.youtube.com/watch?v=eacfDwzGLeO.*

* cited by examiner

*Primary Examiner* — Liang Y Li
(74) *Attorney, Agent, or Firm* — Rowan TELS LLC

(57) ABSTRACT

A control system for a digital device includes a feed style machine display interface reactive to transfer of access rights to events associated with an association of friends.

5 Claims, 13 Drawing Sheets

DYNAMIC LINEAR CONTROL INTERFACE FOR SPATIAL-TEMPORAL COORDINATE TRACKING

CROSS-REFERENCE TO RELATED APPLICATIONS

This application claims benefit under 35 U.S.C. 119 to U.S. application Ser. No. 62/344,916, filed on Jun. 2, 2016, which is incorporated herein by reference in its entirety.

BACKGROUND

Existing machine feed control interfaces may benefit from improvements in relevance and prioritization, particularly for events having a social dimension.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of a system and process to transact access rights to events using a feed style machine user interface. Rankings for graphical controls may be adjusted based on relationships configured between users, for example in a social graph. The control interface may be considered as a "go with friends" feed style machine display interface.

Figure 1:
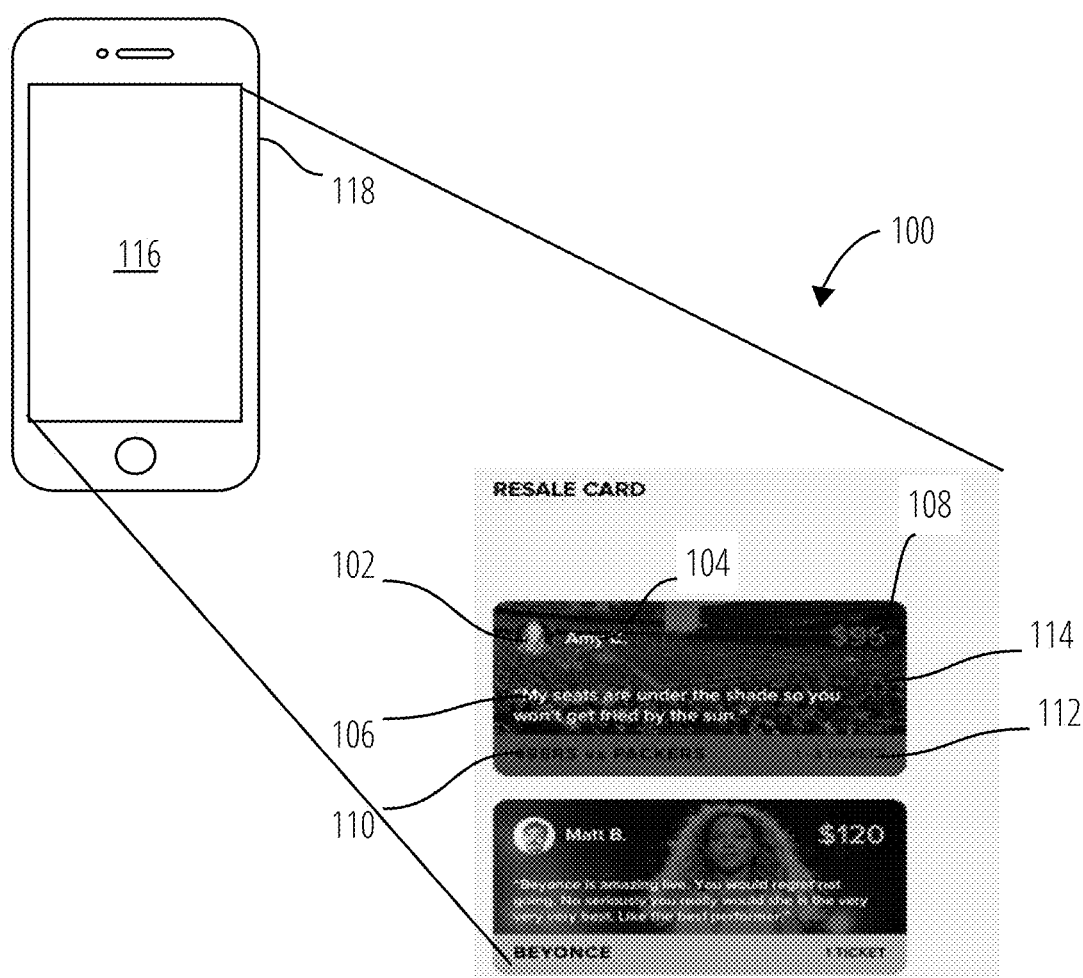
FIG. 1 illustrates an embodiment of a graphical control 100.

Referring to FIG. 1, a graphical control 100 comprises an event depiction 114 (e.g., a digital image) over which is superimposed a transaction cost 108, a visual owner depiction 102, a textual depiction of associated owner 104, and a textual elaboration 106. Below the event depiction 114 is an event description 110 and a transaction quantity 112.

The graphical control 100 may be operated on a display 116 of a digital device 118 by a user of the digital device 118 to effect a change in access rights to a physical event associated with a spatial-temporal coordinate or range. Each of the graphical control 100 may be configured to receive a machine interface control input via the display 116 of the digital device 118. The machine interface control input may include haptic inputs, audio controls, etc. The digital device 118 may display further confirmation controls in response to the activation of the machine interface control input, the confirmation controls configured to received a machine interface control input.

A filter control 702 may be operable to cause controls of this type to only be accessible to other users that have a configured relationship with the associated owner of the access rights, or accessible to such users on a priority basis (e.g., accessible to them earlier in time).

Figure 2:
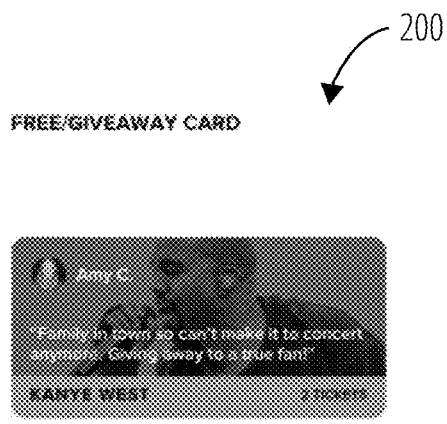
FIG. 2 illustrates an embodiment of a graphical control 200.

Referring to FIG. 2, in one embodiment in which the access rights to the event are transferred without cost, the transaction cost 108 may be omitted from the graphical control 100 (e.g., see graphical control 200). A filter control 702 may be operable to cause controls providing no cost transfer of access rights to only be accessible to other users that have a configured relationship with the associated owner of the access rights, or accessible to such users on a priority basis (e.g., accessible to them earlier in time).

Figure 3:
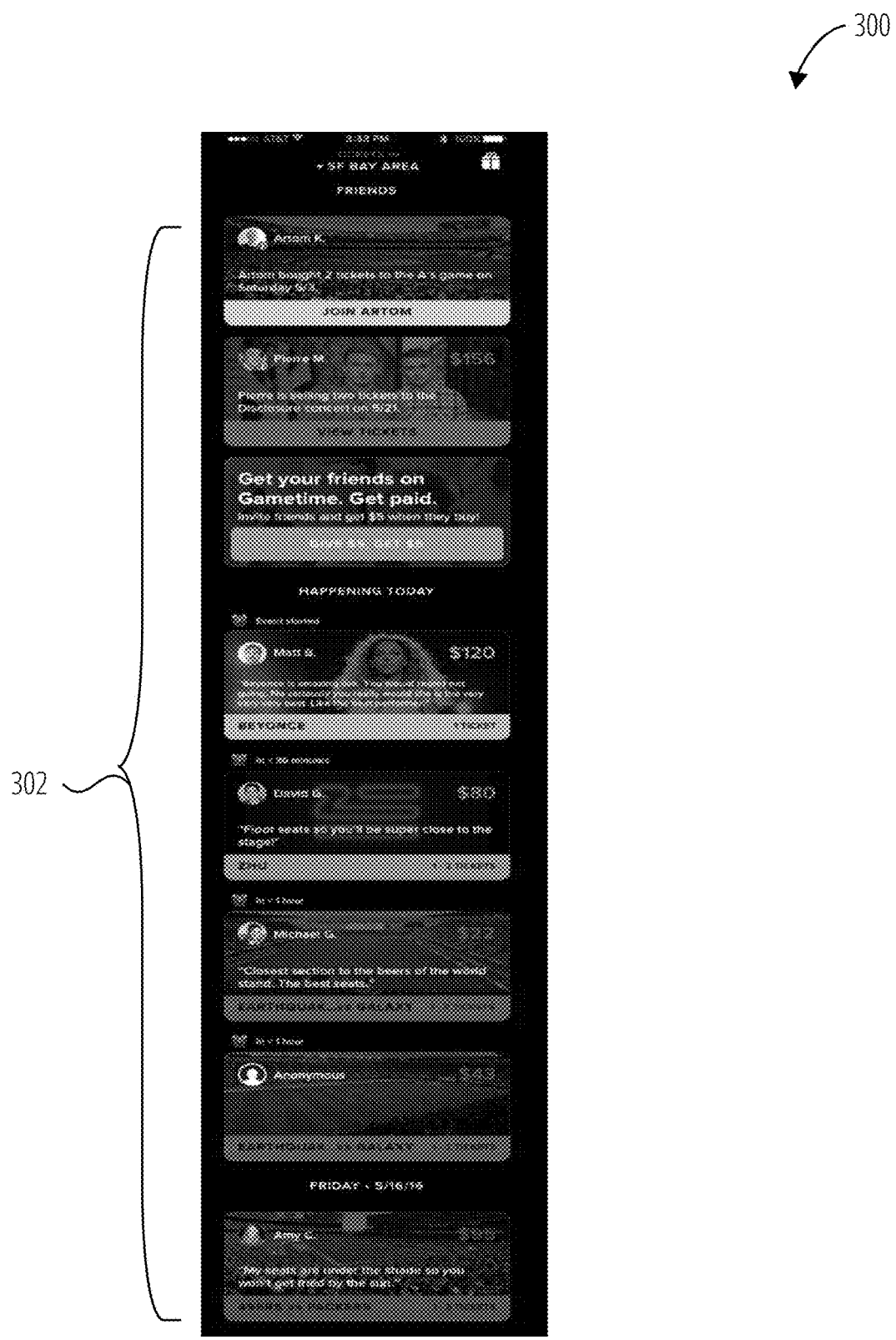
FIG. 3 illustrates an embodiment of a graphical control layout 300.

Referring to FIG. 3, the graphical control layout 300 comprises a plurality of graphical controls 302.

The graphical control layout 300 may be displayed on the display 116 of the digital device 118. Each of the plurality of graphical controls 302 may be configured to receive a machine interface control input, and in response operate the digital device 118 to generate a machine interface control. The machine interface control may effect a change in access rights to a physical event.

The graphical control layout 300 may receive instruction to arrange the plurality of graphical controls 302 by a layout generator that further comprises a prioritizer and a filter. As depicted in FIG. 3, the plurality of graphical controls 302 have been arranged to be displayed with graphical controls in an association of friends. The association of friends may be determined by various methods including by activation of an association of friends activator, one or more transfers of access rights between user accounts, and altering the prioritizer to include a specific user account in the association of friends. Each of the above methods results in a configured relationship. The graphical controls may further be arranged by the layout generator according to transaction cost, lack thereof, and by the time remaining. In some embodiments, the plurality of graphical controls 302 are filtered according to a selected spatial range.

Figure 4:
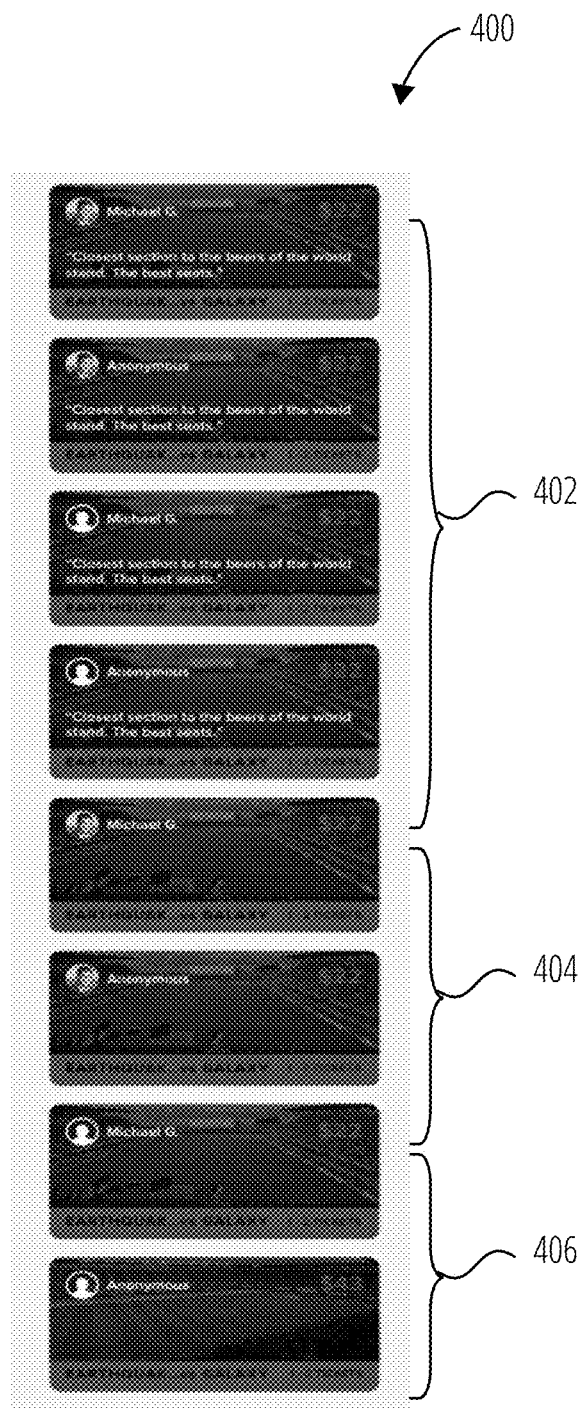
FIG. 4 illustrates an embodiment of a user interface control layout 400.

Referring to FIG. 4, a user interface control layout 400 of the plurality of graphical controls may be organized based on control inputs from a prioritizer to a layout generator. The control layout on the display 116 is dynamically adjusted based on actions of a collection of networked system users. The highest priority on the user interface control layout 400 (graphical machine controls 402) is assigned to graphical control elements that have an associated textual elaboration 106 control. The textual elaboration 106 may be overlayed on the event depiction 114 of the graphical control element.

A second highest priority (graphical machine controls 404) on the user interface control layout 400 may be assigned to graphical control elements having an associated visual owner depiction 102, but lacking a textual elaboration 106. The visual owner depiction 102 may be overlayed on the event depiction 114 of the graphical control.

Graphical control elements lacking an associated visual owner depiction 102 or textual elaboration 106 may be assigned a lowest priority (graphical machine controls 406) in the user interface control layout 400 on the display 116. In one embodiment, the presence of a textual depiction of associated owner 104 does not influence the last ranking of graphical machine controls 406 that don't have an associated textual elaboration 106 or visual owner depiction 102.

Receipt of a visual owner depiction 102 or textual elaboration 106 at any time may cause dynamic alteration of the user interface control layout 400 under the influence of the prioritizer.

Graphical control elements may be removed from the user interface control layout 400 as influenced by a spatial-temporal monitor. For example, if a temporal coordinate associated with a graphical control element exceed a threshold in time for an event, and/or location for a user of the device displaying the control layout in relation to a spatial coordinate of an event, the associated graphical control element may be removed from the user interface control layout 400 on the user's device.

An interface for a prioritization control 500 may enable an associated owner to input a textual elaboration 106 to improve a priority of a graphical control on the user interface control layout 400.

Figure 5:
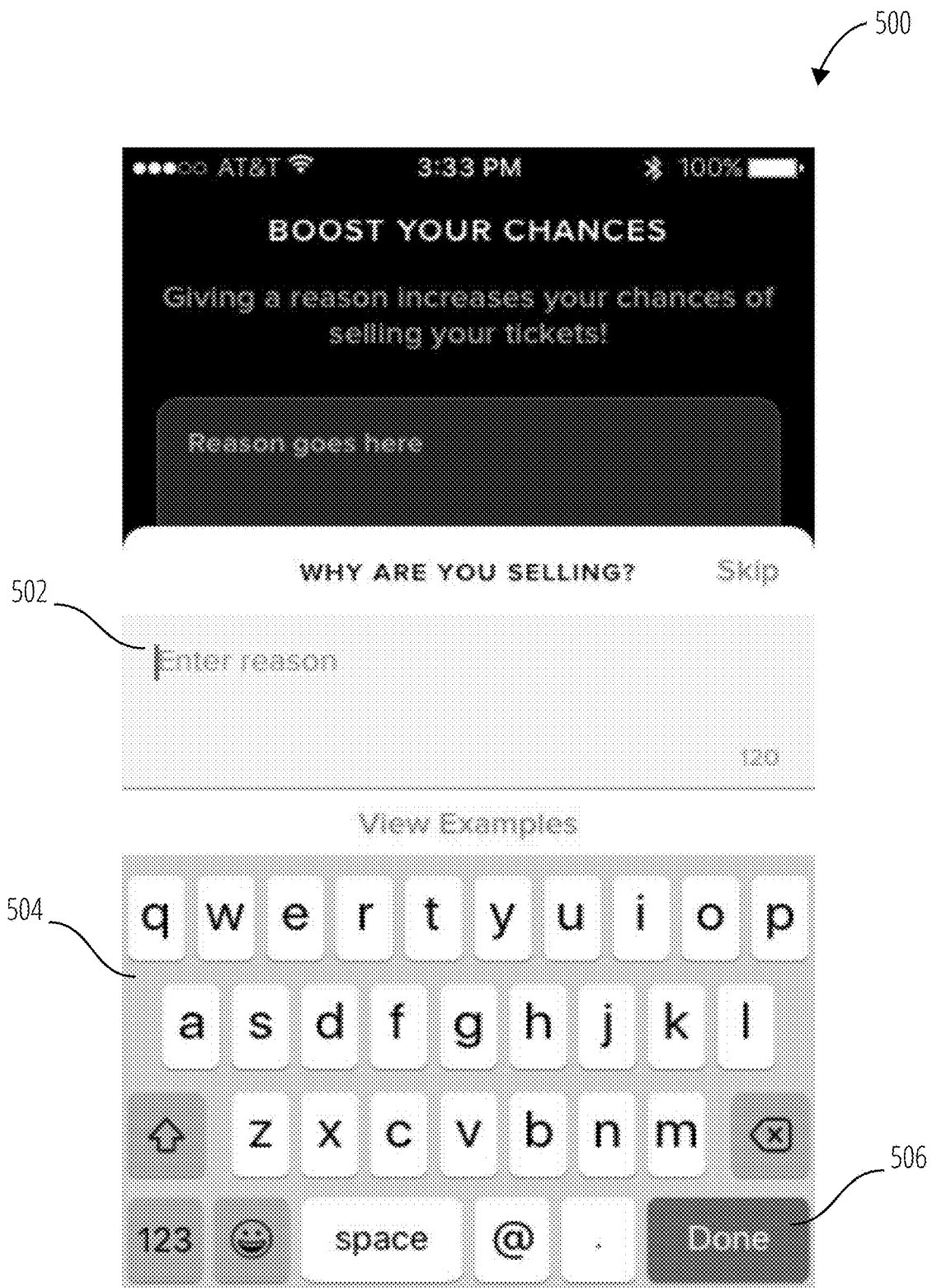
FIG. 5 illustrates an embodiment of a prioritization control 500.

Referring to FIG. 5, the prioritization control 500 comprises a priortization display 502, a priortization machine interface control input 504, and a priortization activator 506.

The priortization display 502 may react to the inputs received by the priortization machine interface control input 504. The priortization machine interface control input 504 may receive inputs which may be stored locally and displayed by the priortization display 502 until the priortization activator 506 is activated. The priortization activator 506 may receive an input and in response associate the inputs received by the priortization machine interface control input 504 with a transfer of access rights.

Figure 6:
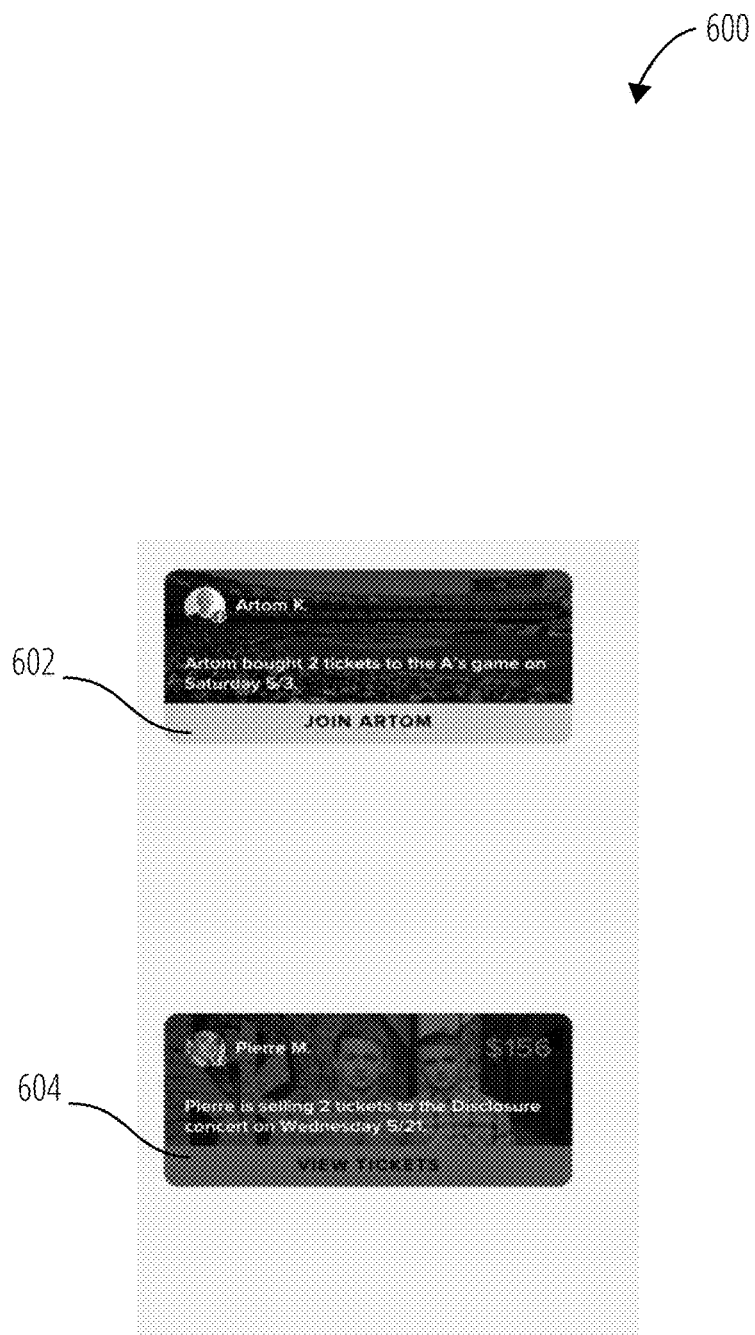
FIG. 6 illustrates an embodiment of a graphical control 600.

Referring to FIG. 6, the graphical control 600 comprises a join control 602 and a view control 604.

The area under the event depiction 114 may be dynamically transformed into a join control 602 or a view control 604 based on actions by the associated owner of the access rights. The relative location of the join control 602 and the view control 604 may be affected by the further action of the associated owner based on the operation or the prioritizer.

Figure 7:
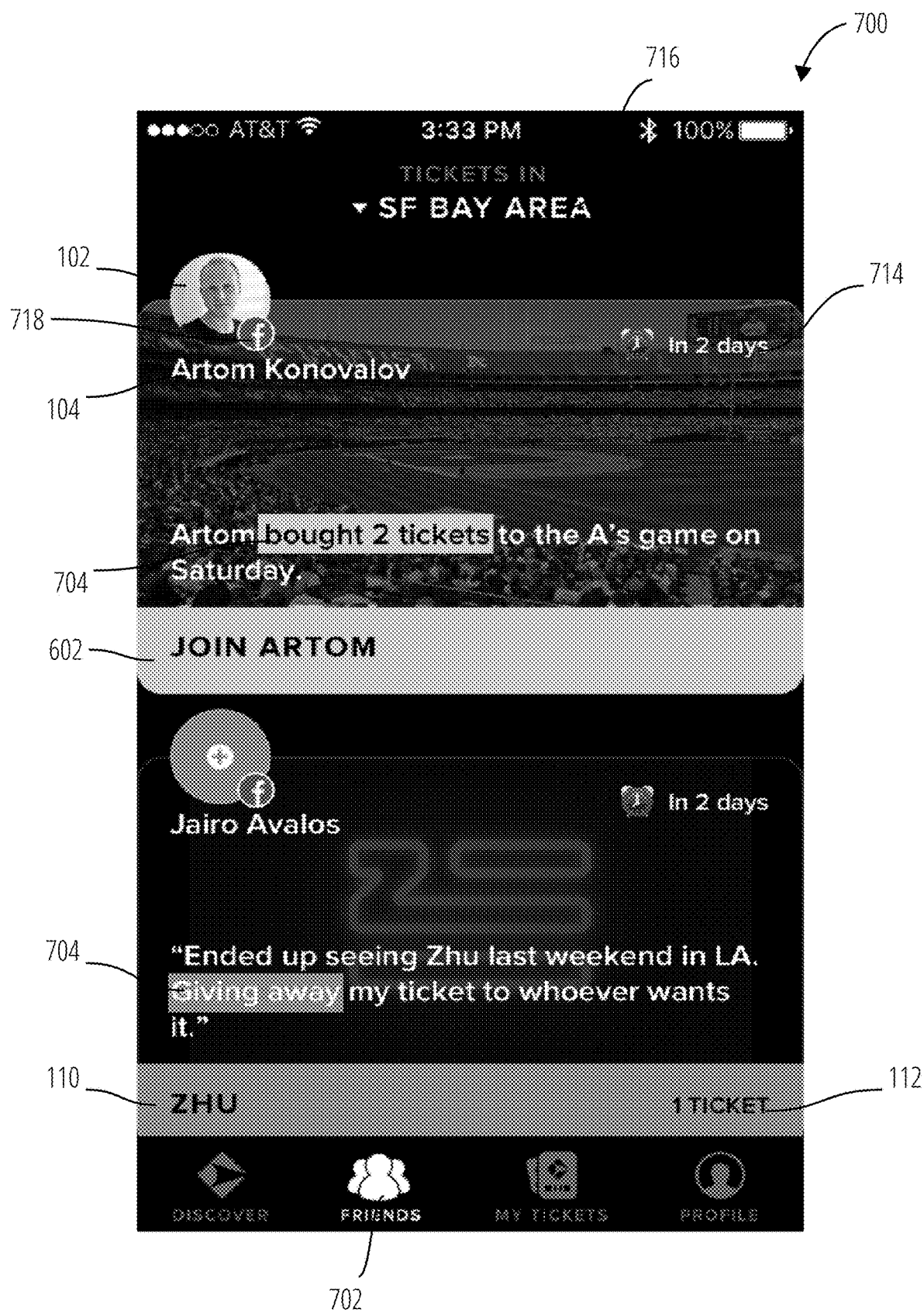
FIG. 7 illustrates an embodiment of a graphical control 700.

Referring to FIG. 7, a graphical control 700 may in one embodiment include one or more of a filter control 702, a visual enhancement 704, a temporal range locator 714, a spatial range locator 716, and an associated relationship graph 718.

The visual enhancement 704 may be responsive to actions by the associated owner of access rights to an event. For example, if the associated owner receives access rights to the event, or indicates an intention to not attend the event, the visual enhancement 704 may be dynamically altered to reflect these actions. The visual enhancement 704 may also be responsive to a visual enhancement system. The visual enhancement system determines a visual enhancement 704 to add to the textual elaboration 106 and instructs the machine interface control to alter the textual elaboration 106 to add the visual enhancement 704.

The graphical control 700 may be dynamically transformed to include the join control 602 when an action by the associated owner indicates his or her intent to be present at the upcoming event. Operation of the join control 602 by a user of the digital device 118 may cause the display of graphical controls on the display 116 that enable a transfer of access rights to the event.

The spatial range locator 716 may operates as a filter control for the displayed graphical controls, limiting or sorting the display to graphical controls for events in a selected spatial (e.g., geographical) range. The temporal range locator 714 may indicate a time interval remaining before an event and, in some embodiments, may be operated to filter or sort the displayed graphical controls by time or remaining time to events. The graphical control 700 may be transformed to remove the join control 602 if the associated owner indicates intent to not be present at the upcoming event.

Figure 8:
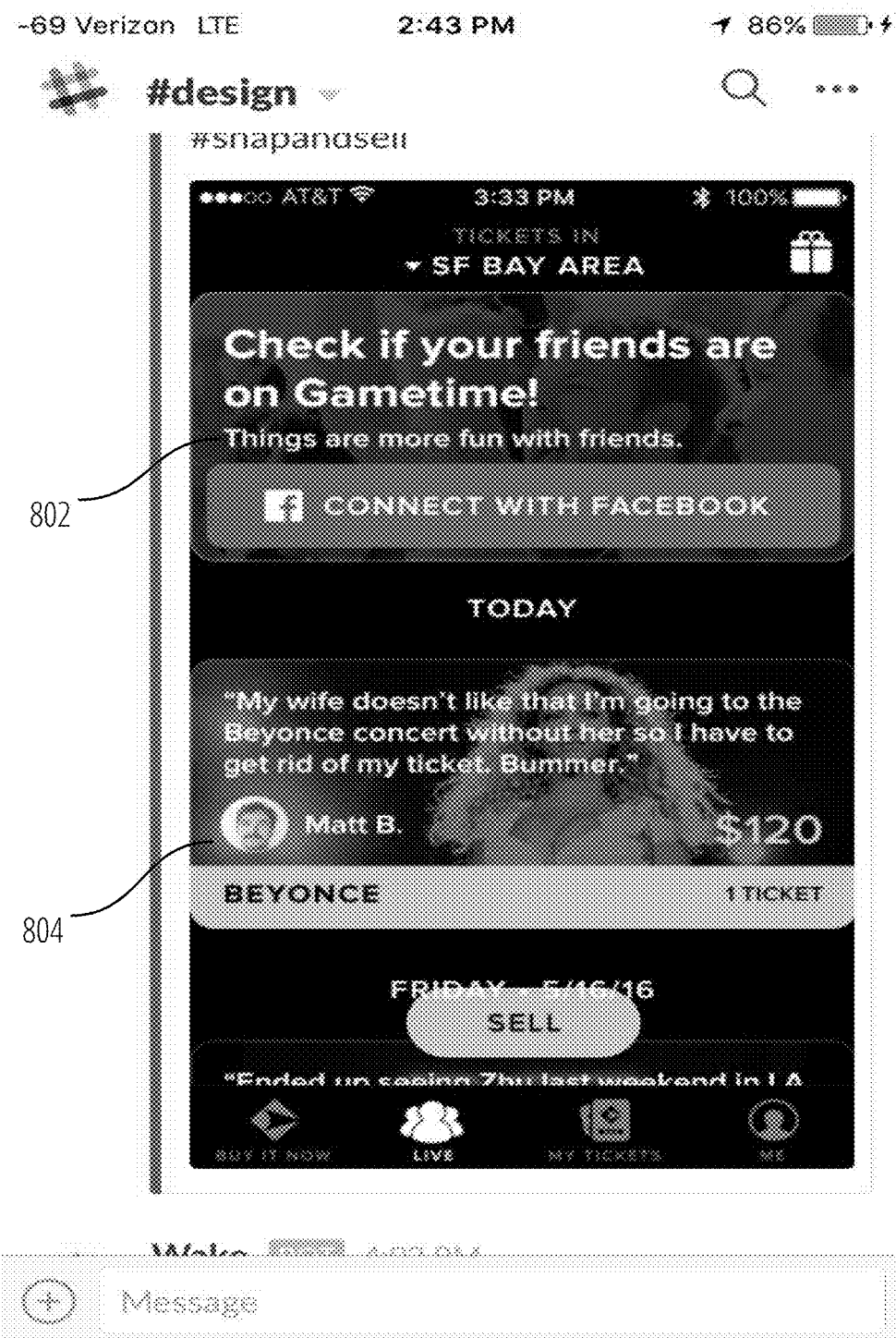
FIG. 8 illustrates an embodiment of an aspect of a relationship filter control 702.

The filter control 702 may operate to filter or sort the displayed graphical controls to include only graphical controls for users that are associated by relationship (e.g., in one or more social graphs). The associated relationship graph 718 may indicate a source of the relationship between the associated owner and the user of the digital device 118. FIG. 8 illustrates one embodiment of a filter control 702.

Referring to FIG. 8, the system comprises an association of friends activator 802 and a filtered plurality of graphical controls 804.

The association of friends activator 802 may receive a machine interface control input. In response, a user account associated with the digital device 118 displaying the display 116 may be associated with other user accounts. The graphical controls associated with those user accounts may be prioritize based on the association and may have the display altered to display the associated relationship graph 718.

The filtered plurality of graphical controls 804 are the set of graphical controls displayed in response to the activated set of filtering controls. As depicted, the set of filtering controls is based on the association of friends.

Figure 9:
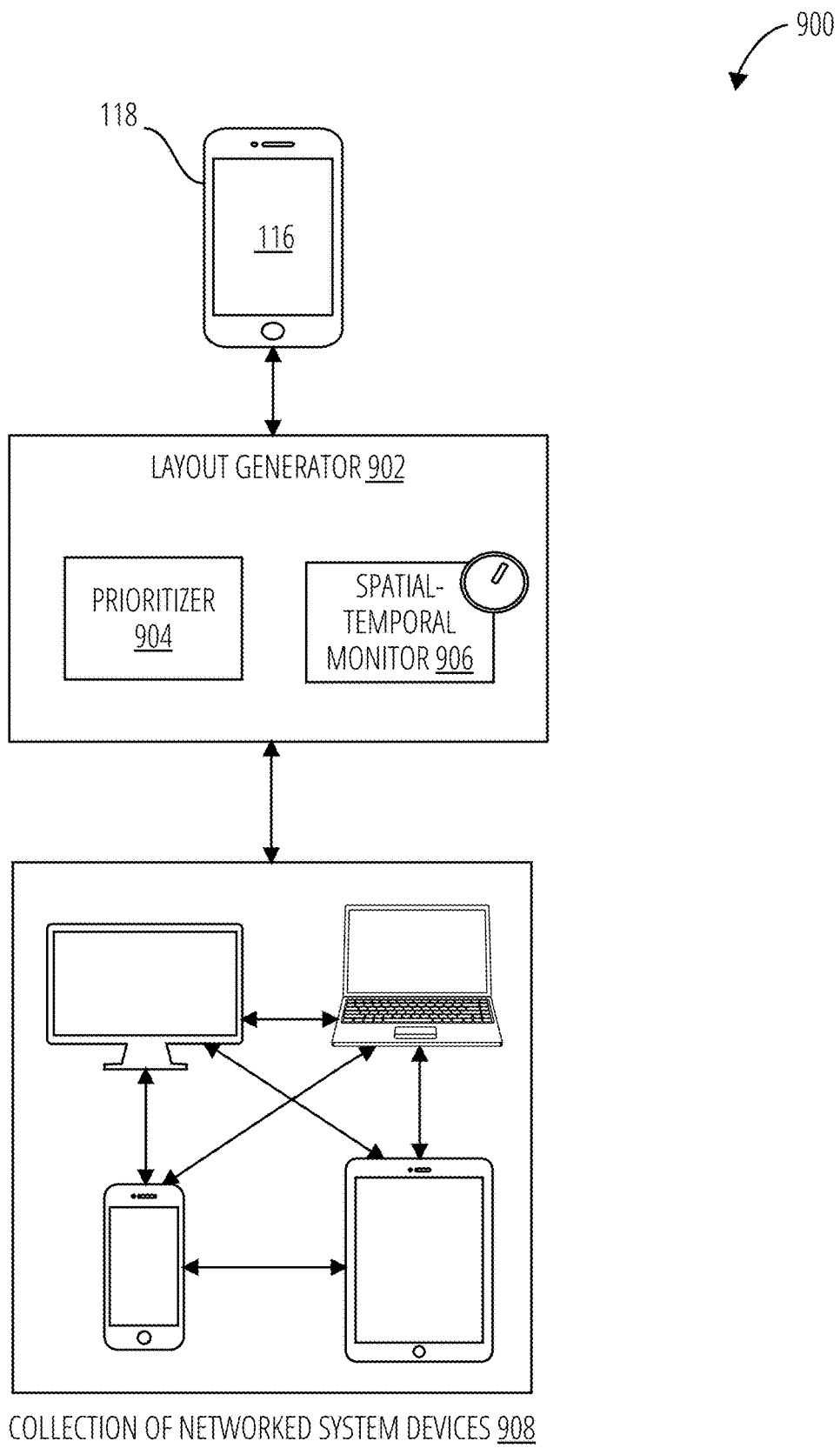
FIG. 9 illustrates a control system 900 in accordance with one embodiment.

Referring to FIG. 9, the control system 900 comprises a display 116, a digital device 118, a layout generator 902, a prioritizer 904, a filter 906, and a collection of networked system devices 908.

The control system 900 generates a user interface control layout 400 on a display 116 of a digital device 118. Actions by a user of the digital device 118 to transfer access rights to an upcoming event are communicated to a layout generator 902, which may further comprise a filter 906 and a prioritizer 904. The layout generator 902 interacts with the prioritizer 904 and the filter 906 to produce a set of graphical controls, which may be filtered and prioritized, that are displayed as the user interface control layout 400 on the display 116 of the digital device 118. The layout generator 902 sends a machine display interface control, such as a feed style machine display interface control, to the digital device 118 comprising instructions for the digital device 118 to alter the display 116 according to the set of graphical controls determined by the layout generator 902. The layout generator 902 may receive a plurality of graphical controls from the collection of networked system devices 908 to filter, prioritize, and provide instructions to display. The layout generator 902 may also receive machine interface control input from the digital device 118 to alter the operation of the filter 906. The layout generator 902 may also receive a machine interface control input to associated a transfer of access rights associated with one of the set of graphical controls. The layout generator 902 may send further controls in response to the collection of networked system devices 908 with instruction to perform the transfer.

The collection of networked system devices 908 may be operated to generate the plurality of graphical controls and send the plurality of graphical controls to multiple other devices including the digital device 118. The collection of networked system devices 908 may also, in response to receiving instructions from the layout generator 902, perform actions to complete the transfer of access rights. These action may include payment authorization and transfer, notification, and transfer of a notice of access rights (e.g., a ticket, which may be digitized). The control system 900 may be operated in accordance with FIG. 10, FIG. 11, and FIG. 12.

Figure 10:
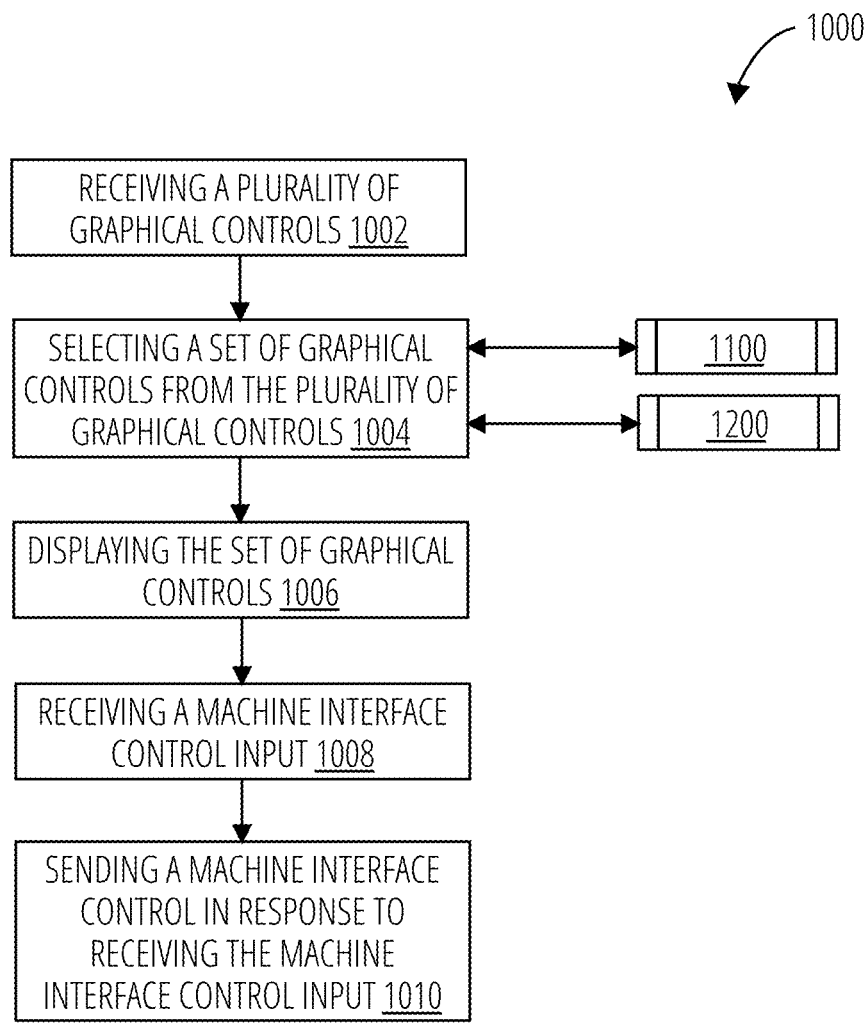
FIG. 10 illustrates an embodiment of an access rights transfer method 1000.

Referring to FIG. 10, the access rights transfer method 1000 receives a plurality of graphical controls (block 1002). The plurality of graphical controls may be received from a collection of networked system devices. Each of the plurality of graphical controls may be associated with a transfer of access rights. A set of graphical controls is selected from the plurality of graphical controls (block 1004). The selection may further comprise the filter method 1100 and the prioritization method 1200. The set of graphical controls is then displayed (block 1006). A feed style machine display interface may be utilized to display the set of graphical controls. A machine interface control input is received (block 1008). The machine interface control input may be received by the feed style machine display interface. A machine interface control is sent in response to receiving the machine interface control input (block 1010). In some embodiments, the machine interface control effects a transfer of access rights to an event. The transfer may effects a give away of the access rights to one or more members of an association of friends.

Figure 11:
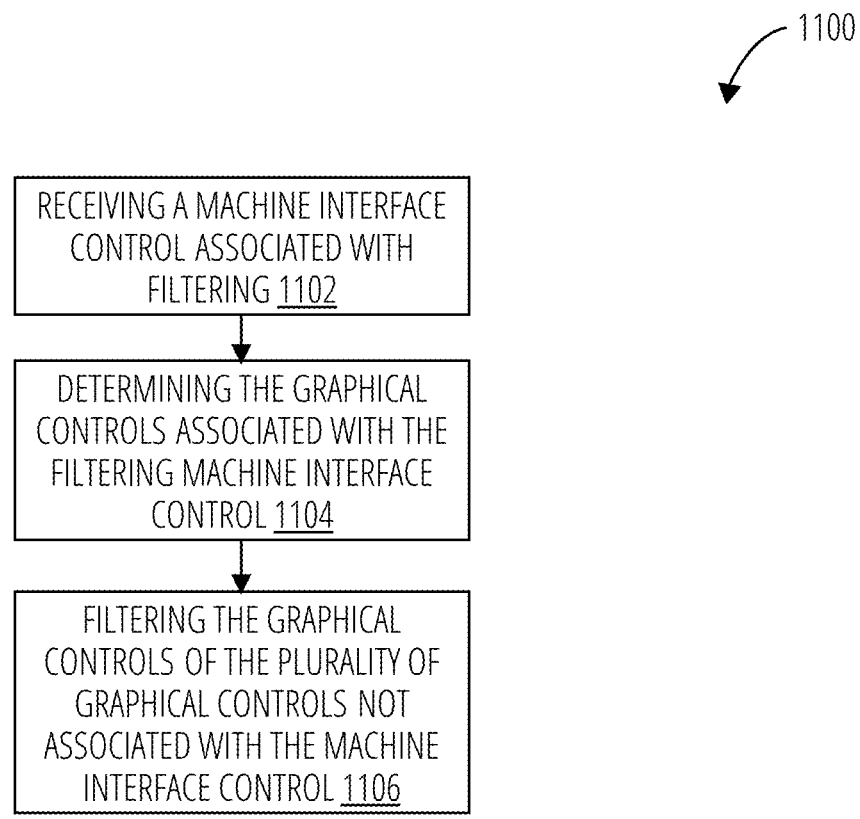
FIG. 11 illustrates an embodiment of a filter method 1100.

Referring to FIG. 11, the filter method 1100 comprises a receiving a machine interface control associated with filtering (block 1102). The graphical controls associated with the filtering machine interface control are determined (block 1104). The graphical controls of the plurality of graphical controls not associated with the machine interface control are filtered (block 1106). The machine interface control may comprise instructing filtering of the plurality of graphical controls based on a configured relationship, a selected spatial range, and a time remaining to an event.

Figure 12:
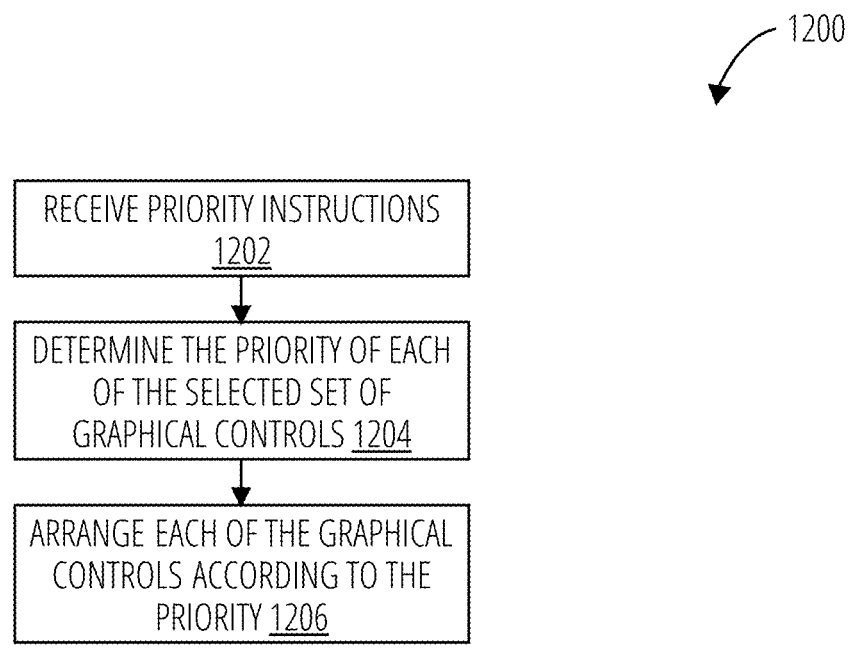
FIG. 12 illustrates an embodiment of prioritization method 1200.

Referring to FIG. 12, the prioritization method 1200 comprises a receives priority instructions (block 1202). The priority of each of the selected set of graphical controls is determined (block 1204). Each of the graphical controls is arranged according to the priority (block 1206). The arrangement may affect the display of the set of graphical controls.

In some embodiments, the priority is based on a configured relationship. The priority may also be based on a time remaining to an event. The priority instructions may control the feed style machine display interface similar to that depicted above in reference to FIG. 4.

Figure 13:
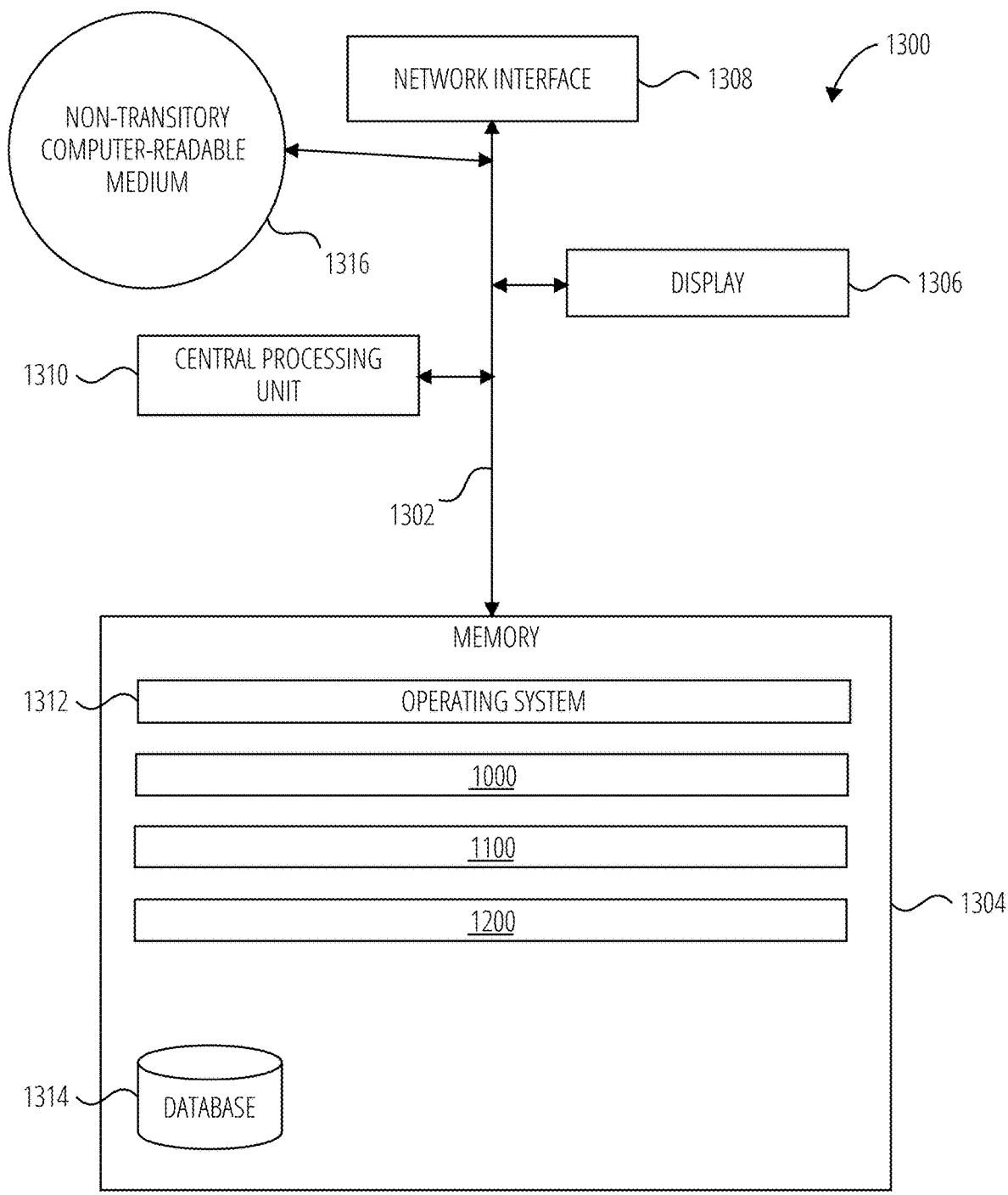
FIG. 13 illustrates a system 1300 in accordance with one embodiment.

FIG. 13 illustrates several components of an exemplary system 1300 in accordance with one embodiment. Such a system may be used to implement the control system embodiments described herein. In various embodiments, system 1300 may include a desktop PC, server, workstation, mobile phone, laptop, tablet, set-top box, appliance, or other computing device that is capable of performing operations such as those described herein. In some embodiments, system 1300 may include many more components than those shown in FIG. 13. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1300 may comprise one or more physical and/or logical devices that collectively provide the functionalities described herein. In some embodiments, system 1300 may comprise one or more replicated and/or distributed physical or logical devices.

In some embodiments, system 1300 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1300 includes a bus 1302 interconnecting several components including a network interface 1308, a display 1306, a central processing unit 1310, and a memory 1304.

Memory 1304 generally comprises a random access memory ("RAM") and permanent non-transitory mass storage device, such as a hard disk drive or solid-state drive. Memory 1304 stores an operating system 1312.

These and other software components may be loaded into memory 1304 of system 1300 using a drive mechanism (not shown) associated with a non-transitory computer-readable medium 1316, such as a floppy disc, tape, DVD/CD-ROM drive, memory card, or the like.

Memory 1304 also includes database 1314. In some embodiments, system 1300 may communicate with database 1314 via network interface 1308, a storage area network ("SAN"), a high-speed serial bus, and/or via the other suitable communication technology.

In some embodiments, database 1314 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A system comprising:
a layout generator for a control interface on a mobile device, the layout generator configured to:
receive a plurality of graphical controls for the mobile device from a collection of networked system devices, one or more of the plurality of graphical controls associated by the system to an individual in an association of friends;
generate a feed style machine display interface control comprising instructions to display the plurality of graphical controls prioritized first by graphical controls comprising a textual elaboration and second by graphical controls comprising a visual owner depiction;
wherein the layout generator is coupled to a filter that temporally prioritizes presentation of a subset of the plurality of graphical controls in the feed style machine display interface control, the subset of the plurality of graphical controls that are prioritized temporally being only those graphical controls associated with individuals associated by the system to a user of the mobile device via the association of friends; and
each graphical control operable to effect a transfer of access rights of an event to the mobile device.

2. The system of claim 1, further comprising a spatial temporal monitor to organize the feed style machine display interface control by time remaining to an event associated with a graphical control in the feed style machine display interface control and physical distance of the mobile device from the event associated with the graphical control in the feed style machine display interface control.

3. A system comprising:
a layout generator for a control interface on a mobile device, the layout generator configured to:
receive a plurality of graphical controls for the mobile device from a collection of networked system devices, each of the plurality of graphical controls associated by the system to an individual in an association of friends;
generate a feed style machine display interface control comprising instructions to display the plurality of graphical controls prioritized first by graphical controls comprising a textual elaboration and second by graphical controls comprising a visual owner depiction;
wherein the layout generator is coupled to a filter that removes presentation of a subset of the plurality of graphical controls in the feed style machine display interface control, the removed subset of graphical controls being only those graphical controls for individuals not associated by the system to a user of the mobile device via the association of friends;
wherein the layout generator presents graphical controls having an associated zero transaction value in the feed style machine display interface control only if the user of the mobile device has a configured relationship with an individual associated with the graphical controls via the association of friends; and
each graphical control in the feed style machine display interface control operable to effect a transfer of access rights of an event to the mobile device.

4. The system of claim 3, further comprising a spatial temporal monitor to organize the feed style machine display control by time remaining to an event associated with a graphical control in the feed style machine display interface control and physical distance of the mobile device from the event associated with the graphical control in the feed style machine display interface control.

5. The system of claim 3, wherein the layout generator reprioritizes the position of the graphical controls in the feed style machine display interface control in response to receiving a text elaboration or a visual owner depiction for a displayed graphical control lacking a text elaboration or visual owner depiction.

* * * * *